(12) United States Patent
Hanaki (10) Patent No.: US 6,437,685 B2
(45) Date of Patent: Aug. 20, 2002

(54) CORDLESS POWER TRANSMISSION SYSTEM, POWER TRANSMISSION TERMINAL AND ELECTRICAL APPLIANCE

(75) Inventor: Shigeto Hanaki, Hyogo (JP)

(73) Assignees: Mitsubishi Denki Kabushiki Kaisha, Tokyo; Mitsubishi Electric System LSI Design Corporation, Itami, both of (JP)

( * ) Notice: Subject to any disclaimer, the term of this patent is extended or adjusted under 35 U.S.C. 154(b) by 0 days.

(21) Appl. No.: 09/756,128

(22) Filed: Jan. 9, 2001

(30) Foreign Application Priority Data

Jun. 30, 2000 (JP) ........................................ 2000-199294

(51) Int. Cl.[7] ................................................. G08B 9/00
(52) U.S. Cl. ................... 340/286.02; 340/5.1; 340/333; 359/109
(58) Field of Search ........................... 340/286.02, 505, 340/10.1, 10.31, 10.34, 10.42, 10.5, 5.1, 5.8, 693.1, 333, 568.1, 541, 552; 359/109, 142

(56) References Cited

U.S. PATENT DOCUMENTS 4,885,766 A * 12/1989 Yasuoka et al. ........ 359/145 X
5,125,417 A * 6/1992 Nebenzahl .................. 607/154
6,018,690 A * 1/2000 Saito et al. ................. 700/295
6,194,993 B1 * 2/2001 Hayashi et al. ........... 340/10.34
6,198,079 B1 * 3/2001 Essig ................ 340/825.72 X

FOREIGN PATENT DOCUMENTS

| JP | 2-93812 | 4/1990 |
|---|---|---|
| JP | 8-106340 | 4/1996 |
| JP | 8-130840 | 5/1996 |
| JP | 8-186925 | 7/1996 |
| JP | 10-271230 | 10/1998 |

OTHER PUBLICATIONS

"Smart Battery Charger Specification", SBS Implementer Forum, Dec. 11, 1998, Rev. 1.1.

* cited by examiner

Primary Examiner—Thomas Mullen
(74) Attorney, Agent, or Firm—Burns, Doane, Swecker & Mathis, LLP (57) ABSTRACT

A cordless power transmission system can transmit and receive power stably without malfunctions. A power transmission terminal transmits default power to an electrical appliance by diffractive electromagnetic waves. The electrical appliance transmits its own unique data and required power intensity data to the power transmission terminal by diffractive electromagnetic waves. A network host assigns an ID to the electrical appliance. Under the control of the network host, the power transmission terminal transmits the assigned ID data and the power with the required intensity to the electrical appliance by rectilinear electromagnetic waves.

11 Claims, 8 Drawing Sheets

CORDLESS POWER TRANSMISSION SYSTEM, POWER TRANSMISSION TERMINAL AND ELECTRICAL APPLIANCE

BACKGROUND OF THE INVENTION

1. Field of the Invention

The present invention relates to a cordless power transmission system, power transmission terminal and electrical appliance, which transfer power by electromagnetic waves.

2. Description of Related Art

As a conventional cordless power transmission system, there is known an LSI that is used for non-contact card or the like. It receives very feeble microwaves emitted into a communication space within a certain range, and operates by converting them into electric power. Such a system is applied to simple data transfer in ticket inspection at a ski lift, or in an intelligent transport system, for example.

Since the conventional cordless power transmission system supposes a single device within a narrow range, it cannot designate a specific device when there are multiple LSI cards within the range of the very feeble microwaves. Thus, the system can bring about erroneous operations in such a situation, presenting a problem of being unsuitable for large scale data communications or radio power transmission. Besides, the system is lacking in versatility with only limited applications.

SUMMARY OF THE INVENTION

The present invention is implemented to solve the foregoing problems. It is therefore an object of the present invention to provide a cordless power transmission system, power transmission terminal and electrical appliance suitable for large scale data communications and radio power transmission, and capable of transmitting and receiving electric power stably without any malfunctions even from separate places, thereby making all electrical appliances in a room wireless, for example.

According to a first aspect of the present invention, there is provided a cordless power transmission system comprising: at least one power transmission terminal connected to a network; at least one electrical appliance supplied with power from the power transmission terminal by electromagnetic waves; a network host connected to the network for managing the electrical appliance via the power transmission terminal; a default power transmitter installed in the power transmission terminal for transmitting default power to the electrical appliance by diffractive electromagnetic waves; a first data transceiver installed in the electrical appliance for receiving default power, and for transmitting unique data and required power intensity data to the power transmission terminal by diffractive electromagnetic waves; a second data transceiver installed in the power transmission terminal for receiving the unique data and required power intensity data from the electrical appliance, and for transmitting them to the network host; and a power transmitter installed in the power transmission terminal for transmitting ID data to be assigned to the electrical appliance and power with a required intensity to the electrical appliance by rectilinear electromagnetic waves, wherein the network host obtains the ID data to be assigned to the electrical appliance from the unique data of the electrical appliance, and obtains the required intensity of the power to be transmitted from the power transmission terminal from the required power intensity data sent from the electrical appliance.

Here, the first data transceiver may continuously transmit the ID data, which is assigned to the electrical appliance by the network host, to the power transmission terminal by the diffractive electromagnetic waves while the electrical appliance is in a normal operation mode, and the second data transceiver may notify the network host of the ID data received by the power transmission terminal.

The cordless power transmission system may further comprise a plurality of power transmission terminals, each of which includes a data collector for collecting intensity data of the electromagnetic waves arriving at the power transmission terminal from the electrical appliance, wherein the network host may obtain a 3-D position of the electrical appliance from the intensity data of the electromagnetic waves collected by the power transmission terminals, and assigns a part of the required intensity power to each of the power transmission terminals.

The cordless power transmission system may comprise at least two power transmission terminals, each of which includes a reflectance detector for detecting reflectance of the rectilinear electromagnetic waves while the power transmission terminals are transmitting required power by the rectilinear electromagnetic waves, and the second data transceiver of each of the power transmission terminals may notify the network host of the reflectance, wherein the network host has the power transmission terminals other than the power transmission terminal whose reflectance of the electromagnetic waves varies substantially, transmit the required power.

The network host may be installed in each room, and the network hosts may be interconnected by a cable to exchange data between the rooms.

The network hosts may be connected to an external communication circuit via a fire wall.

The diffractive electromagnetic waves may consist of radio waves; and the rectilinear electromagnetic waves may consist of light waves.

The power transmitter of the power transmission terminal may convert AC power into light power with the required intensity, transmit it to the electrical appliance by light waves, and carry out information communication with the electrical appliance by the light waves; the default power transmitter may convert the AC power into radio power, and transmit the default power to the electrical appliance by the radio waves; and the second data transceiver may carry out information communication with the electrical appliance by the radio waves.

The electrical appliance may further comprise: a light section for converting light power transmitted from the power transmission terminal into electric power, and for carrying out information communication with the power transmission terminal by light waves, wherein the first data transceiver may convert the radio power transmitted from the power transmission terminal into electric power, and carry out information communication with the power transmission terminal by the radio waves.

According to a second aspect of the present invention, there is provided a power transmission terminal that supplies power to an electrical appliance by electromagnetic waves in accordance with a command sent from a network host connected to a network, the power transmission terminal comprising: a default power transmitter for supplying the electrical appliance by diffractive electromagnetic waves; a data transceiver for receiving unique data and required power intensity data associated with the electrical appliance from the electrical appliance by diffractive electromagnetic waves, and notifies these data to the network host; and a power transmitter for transmitting ID data and power with a required intensity to the electrical appliance by rectilinear electromagnetic waves, the ID data and the required intensity of the power being assigned to the electrical appliance and to the power transmission terminal, respectively, by the network host.

According to a third aspect of the present invention, there is provided an electrical appliance that receives power by electromagnetic waves transmitted from a power transmission terminal connected to a network host through a network, the electrical appliance comprising: a default power receiver for receiving default power from the power transmission terminal by diffractive electromagnetic waves; a data transmitter for transmitting unique data and required power intensity data associated with the electrical appliance to the power transmission terminal by diffractive electromagnetic waves; and a power receiver for receiving ID data and power with a required intensity from the power transmission terminal by rectilinear electromagnetic waves, the ID data and the required intensity of the power being assigned to the electrical appliance and to the power transmission terminal, respectively, by the network host.

DETAILED DESCRIPTION OF THE PREFERRED EMBODIMENTS

The invention will now be described with reference to the accompanying drawings.

Embodiment 1

Figure 1:
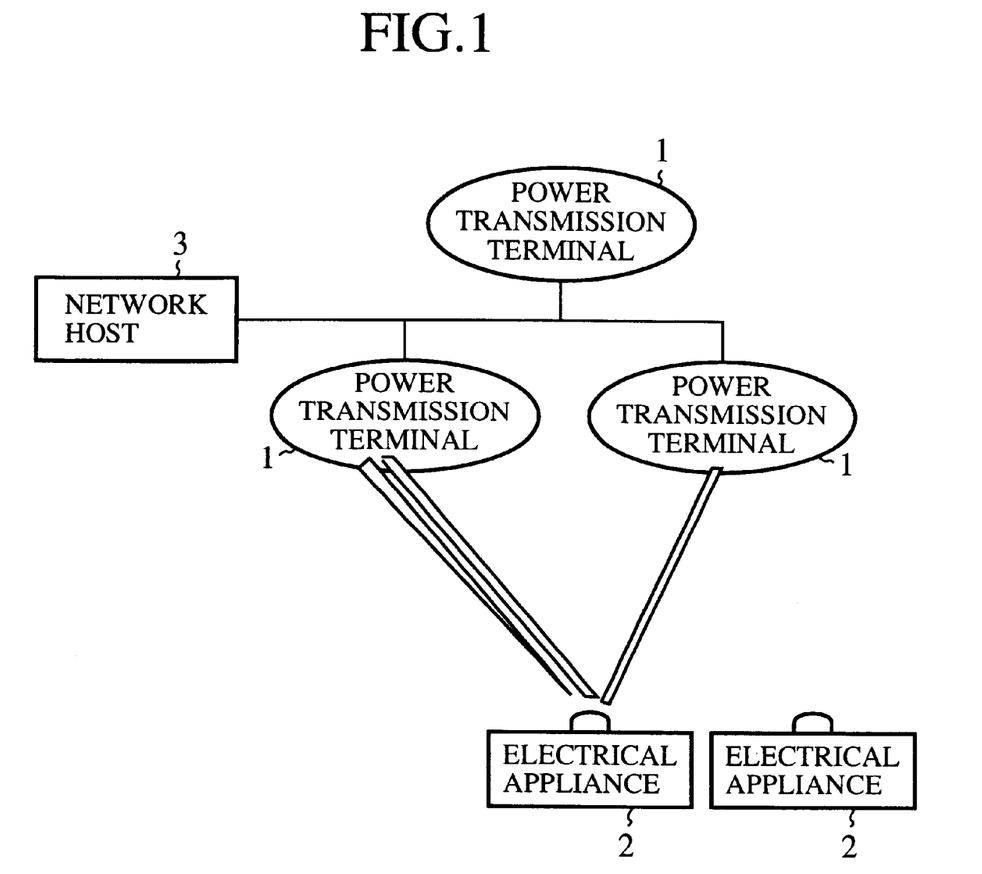
FIG. 1 is a block diagram showing an entire configuration of a cordless power transmission system of an embodiment 1 in accordance with the present invention.

FIG. 1 is a block diagram showing an entire configuration of a cordless power transmission system of an embodiment 1 in accordance with the present invention. In FIG. 1, each reference numeral 1 designates a power transmission terminal connected to a network; 2 designates an electrical appliance that operates by receiving power from one or more power transmission terminals 1; and 3 designates a network host connected with the power transmission terminals 1 through the network.

Figure 2:
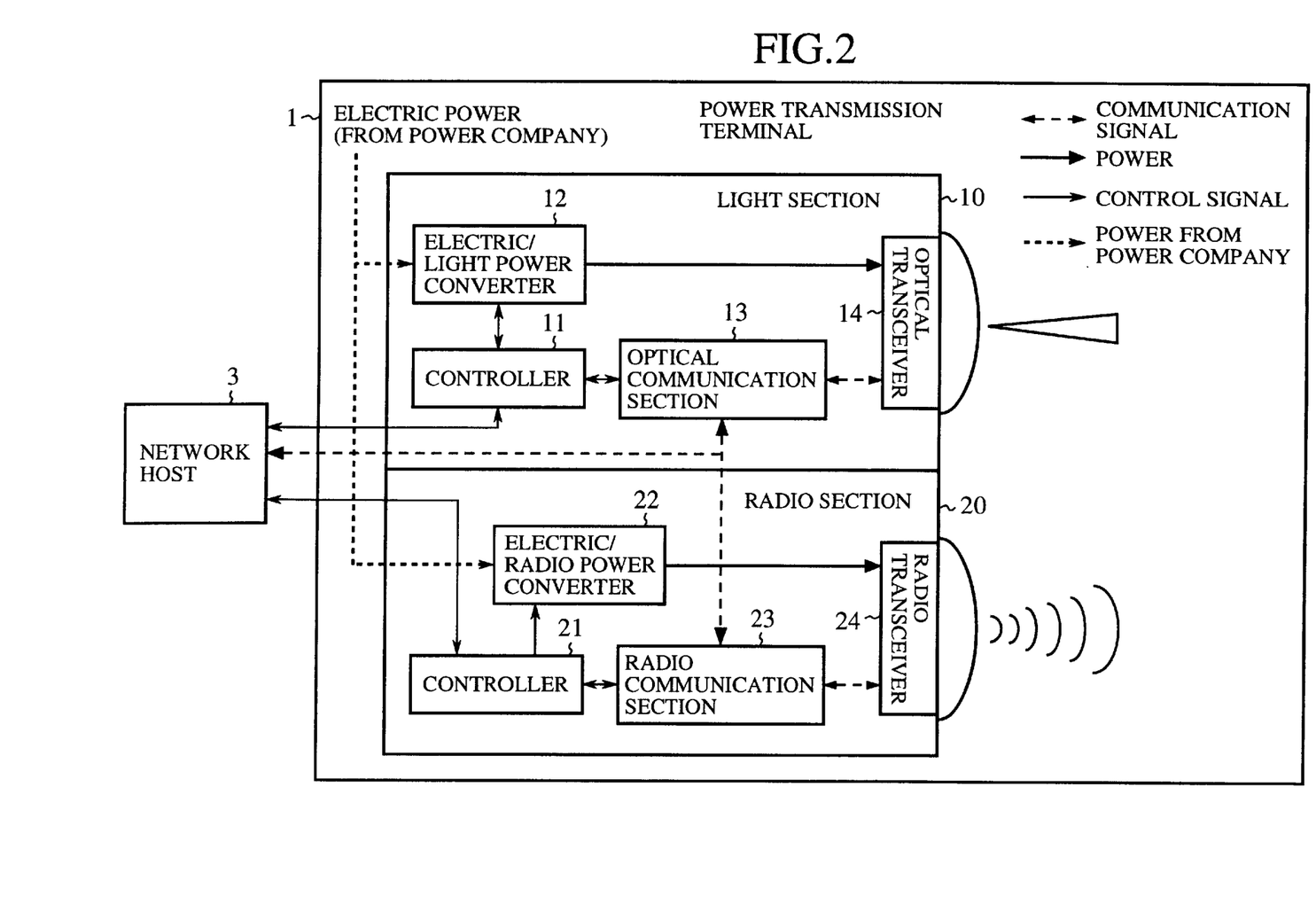
FIG. 2 is a block diagram showing a configuration of a power transmission terminal of the embodiment 1 in accordance with the present invention.

FIG. 2 is a block diagram showing a configuration of the power transmission terminal 1 of the present embodiment 1.

In FIG. 2, the reference numeral 10 designates a light section for supplying power to the electrical appliance 2 by light waves, and exchanges necessary information with the electrical appliance 2 by the light waves; and 20 designates a radio section for supplying power to the electrical appliance 2 by radio waves, and exchanges necessary information with the electrical appliance 2 by radio waves.

In the light section 10, 11 designates a controller for controlling the entire light section 10; 12 designates an electric/light power converter for converting AC power supplied from a power company into light power with the intensity required by the electrical appliance 2; 13 designates an optical communication section for exchanging communications of necessary information with the electrical appliance 2 by the light waves; and 14 designates an optical transceiver for combining the light power fed from the electric/light power converter 12 with the information fed from the optical communication section 13 to send them to the electrical appliance 2, and for receiving the optical information transmitted from the electrical appliance 2 to supply it to the optical communication section 13. The optical transceiver 14 can control the direction of its emitting light.

In the radio section 20, the reference numeral 21 designates a controller for controlling the entire radio section 20; 22 designates an electric/radio power converter for converting AC power supplied from the power company into radio power; 23 designates a radio communication section for exchanging communications of necessary information with the electrical appliance 2 by radio waves; and 24 designates a radio transceiver for combining the radio power fed from the electric/radio power converter 22 with the information fed from the radio communication section 23 to send them to the electrical appliance 2, and for receiving the information transmitted from the electrical appliance 2 by radio waves to supply it to the radio communication section 23.

The controller 11 and optical communication section 13 in the light section 10, and the controller 21 and radio communication section 23 in the radio section 20 are connected to the network host 3 by wire to undergo control by the network host 3.

Figure 3:
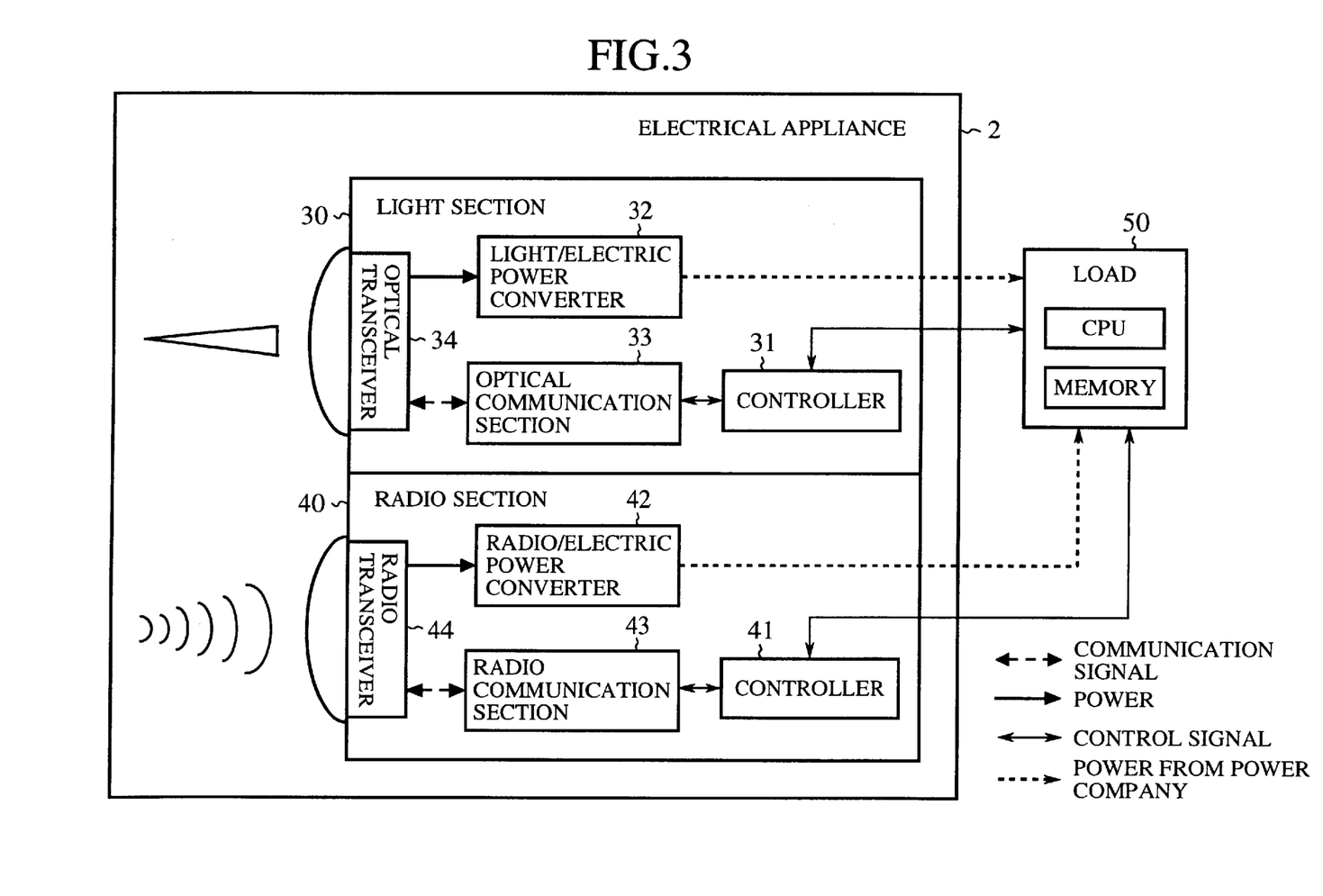
FIG. 3 is a block diagram showing a configuration of an electrical appliance of the embodiment 1 in accordance with the present invention.

FIG. 3 is a block diagram showing a configuration of an electrical appliance of the embodiment 1. In FIG. 3, the reference numeral 30 designates a light section for receiving power transmitted from the power transmission terminal 1 by the light waves, and for exchanging necessary information with the power transmission terminal 1 by light waves; 40 designates a radio section for receiving power transmitted from the power transmission terminal 1 by the radio waves, and for exchanging necessary information with the power transmission terminal 1 by radio waves; and 50 designates a load of the electrical appliance 2 including a CPU and a memory.

In the light section 30, the reference numeral 31 designates a controller for controlling the entire light section 30; 32 designates a light/electric power converter for converting the light power transmitted from the power transmission terminal 1 into electric power; 33 designates an optical communication section for exchanging necessary information with the power transmission terminal 1 by the light waves; and 34 designates an optical transceiver for receiving the optical power and information from the power transmission terminal 1 and dividing them, and for transmitting the information fed from the optical communication section 33 to the power transmission terminal 1.

In the radio section 40, the reference numeral 41 designates a controller for controlling the entire radio section 40;

42 designates a radio/electric power converter for converting the radio power transmitted from the power transmission terminal 1 into electric power; 43 designates a radio communication section for exchanging necessary information with the power transmission terminal 1 by the radio waves; and 44 designates a radio transceiver for receiving the radio power and information from the power transmission terminal 1 and dividing them, and for transmitting the information fed from the radio communication section 43 to the power transmission terminal 1.

Normally, the power transmission terminal 1 carries out the main power transmission/information communication to the electrical appliance 2 by rectilinear light waves, and auxiliary power transmission/information communication by diffractive radio waves. This is because the optical power transmission/information communication is carried out for specific electrical appliance 2, whereas the radio power transmission/information communication is for general electrical appliances 2. Suitably using the rectilinear light waves and diffractive radio waves separately in accordance with the purposes can prevent the malfunction of the multiple electrical appliances 2 in the cordless power transmission system.

The network host 3 analyzes the information sent from the power transmission terminals 1, and integrally controls the specific power transmission terminal 1 or all the power transmission terminals 1. Thus connecting the plurality of power transmission terminals 1 via the network by the network host 3 can implement various desired functions through communications between the power transmission terminals 1 and the electrical appliances 2 by the electromagnetic waves.

Next, the operation of the present embodiment 1 will be described.

Figure 4A:
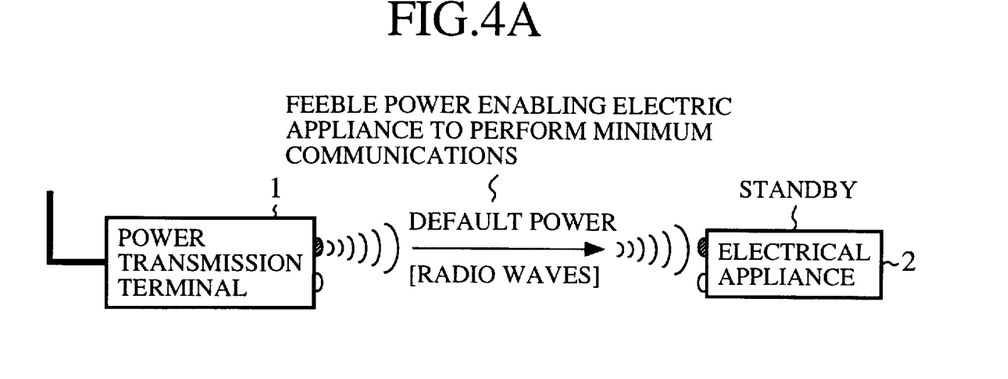
FIGS. 4A–4C are diagrams illustrating operation modes of the cordless power transmission system of the embodiment 1 in accordance with the present invention.
Figure 4B:
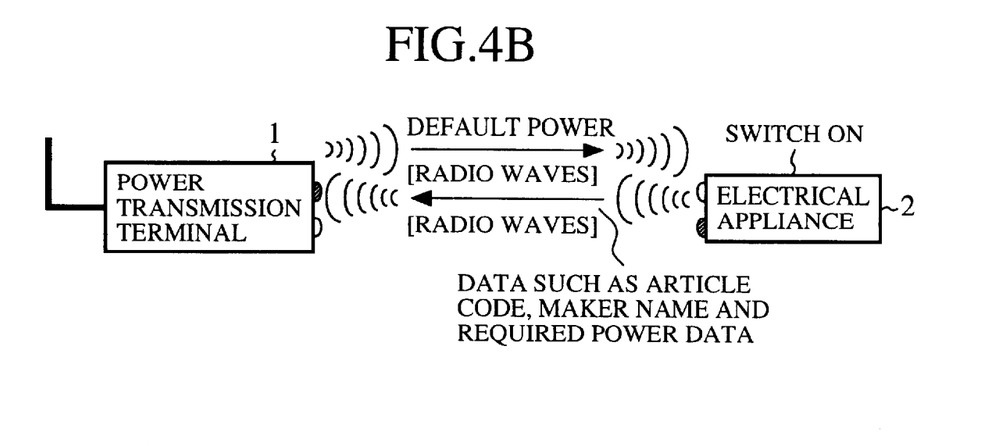
Figure 4C:
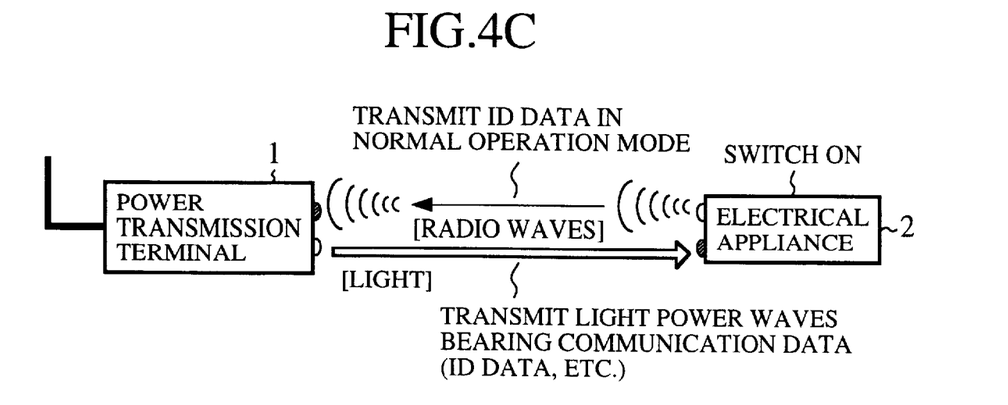

FIGS. 4A–4C are diagrams illustrating operation modes of the cordless power transmission system of the embodiment 1 in accordance with the present invention. First, as illustrated in FIG. 4A, the power transmission terminal 1 continuously transmits default power by the radio waves from the radio transceiver 24 in the radio section 20. The default power is set at such a low level that it can only activate the radio section 40 in the electrical appliance 2. The electrical appliance 2 operates the clock in the radio section 40 by converting the radio power into the electric power, or by utilizing radio resonance without converting, thereby entering a standby mode.

Subsequently, as illustrated in FIG. 4B, when the electrical appliance 2 is switched on from the standby mode by a user, the radio section 40 is partially turned on, and the electrical appliance 2 transmits its unique data and required power intensity data to unspecified power transmission terminals 1. More specifically, the radio communication section 43 transmits the unique data such as an article code, maker name and product code along with the required power intensity data to the unspecific power transmission terminals 1 by radio waves, via the radio transceiver 44, under the control of the controller 41.

Subsequently, receiving the unique data and required power intensity data from the electrical appliance 2 as illustrated in FIG. 4C, the power transmission terminal 1 transmits them to the network host 3 using the radio communication section 23 in the radio section 20. The network host 3 assigns an ID (identifier) to the electrical appliance 2, and commands the power transmission terminal 1 to transmit the assigned ID data and power with the required intensity to the electrical appliance 2 through the optical transceiver 14 in the light section 10. In this case, the ID data is output from the optical communication section 13 and the power with the required intensity is output from the electric/light power converter 12 under the control of the controller 11, to be combined by the optical transceiver 14.

The electrical appliance 2 receives the light beam from the power transmission terminal 1 with the optical transceiver 34 in the light section 30, and decomposes it into data light and power light beam. The light/electric power converter 32 converts the power light beam to electric power, and supplies it to the load 50 as normal operation power. Thus, the electrical appliance 2 is switched on in its entirety, and continuously transmits the ID data sent from the network host 3 back to the network host 3 by the radio waves via the power transmission terminal 1 in order to notify of the location of the electrical appliance 2 itself. The ID data can be defined using the frequency differences in the radio waves.

Transmission of image data from a first electrical appliance 2 to a second electrical appliance 2, for example, can be carried out as follows in the cordless power transmission system. The image data from the first electrical appliance 2 is transmitted to a first power transmission terminal 1 from the optical communication section 33 to the optical communication section 13 that transmits the light power to the first electrical appliance 2. The image data transmitted to the first power transmission terminal 1 is further transmitted, under the control of the network host 3, to the optical communication section 13 of the second power transmission terminal 1 that transmits the light power to the second electrical appliance 2. Then, the image data is transmitted from the optical communication section 13 of the second power transmission terminal 1 to the second electrical appliance 2 by light waves, to be received by the optical communication section 33 of the second electrical appliance 2.

Utilizing such a route makes it possible for the first and second electrical appliances 2 to exchange image data even though they take positions where they cannot communicate directly by the light waves.

Although the present embodiment 1 carries out the main power transmission/information communication by light waves, it can be achieved by any rectilinear electromagnetic waves. In addition, any electromagnetic waves can be used for the auxiliary power transmission/information communication as long as they are diffractive waves. Moreover, as for the AC power supplied from the power company, it can be supplied by light in the future.

As described above, according to the present embodiment 1, the power transmission terminal 1 transmits power to the electrical appliance 2 by light waves and radio waves. This offers an advantage of being able to make the electrical appliance 2 cordless. In addition, the power transmission/information communication between the specific power transmission terminal 1 and specific electrical appliance 2 is carried out by the rectilinear light waves, and the power transmission/information communication between the general power transmission terminals 1 and the general electrical appliances 2 is carried out by the diffractive radio waves. This offers an advantage of being able to operate all the electrical appliances 2 stably by a single system without any malfunctions.

Embodiment 2

The entire configuration of the cordless power transmission system, the configuration of each power transmission terminal 1 and that of each electrical appliance 2 of the present embodiment 2 are the same as their counterparts of the embodiment 1 as shown in FIGS. 1–3. The present embodiment 2 is characterized in that its power transmission terminals 1 are installed on a ceiling of a room or the like.

Next, the operation of the present embodiment 2 will be described.

Figure 5A:
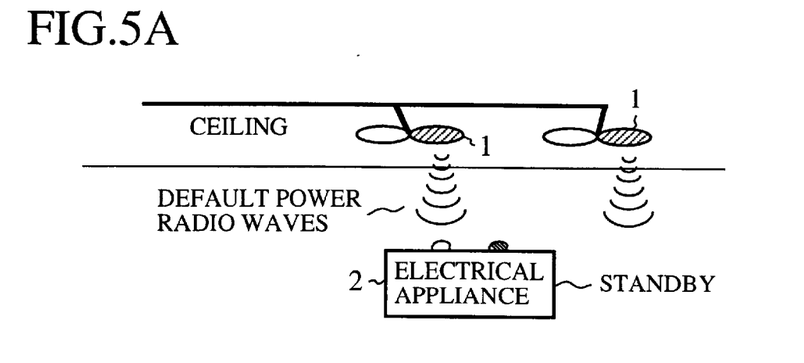
FIGS. 5A–5C are diagrams illustrating detection of a 3-D position of an electrical appliance in an embodiment 2 in accordance with the present invention.
Figure 5B:
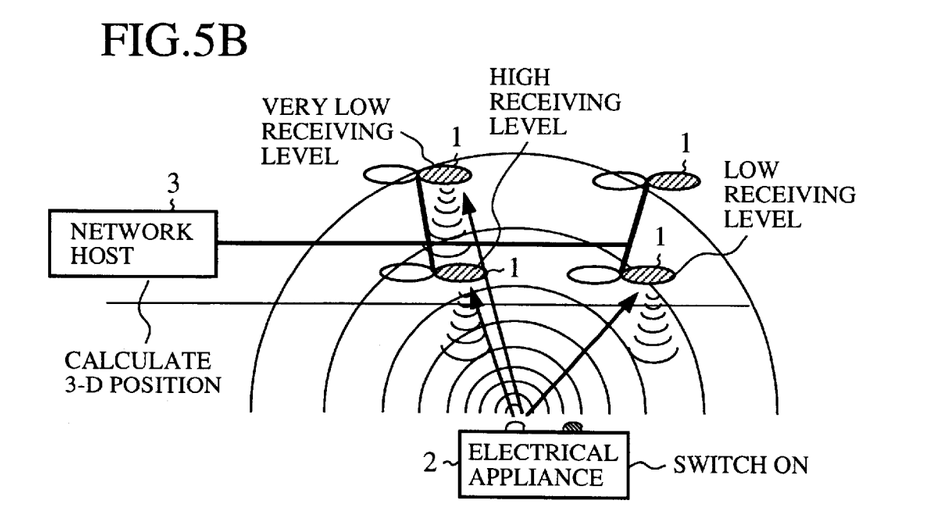
Figure 5C:
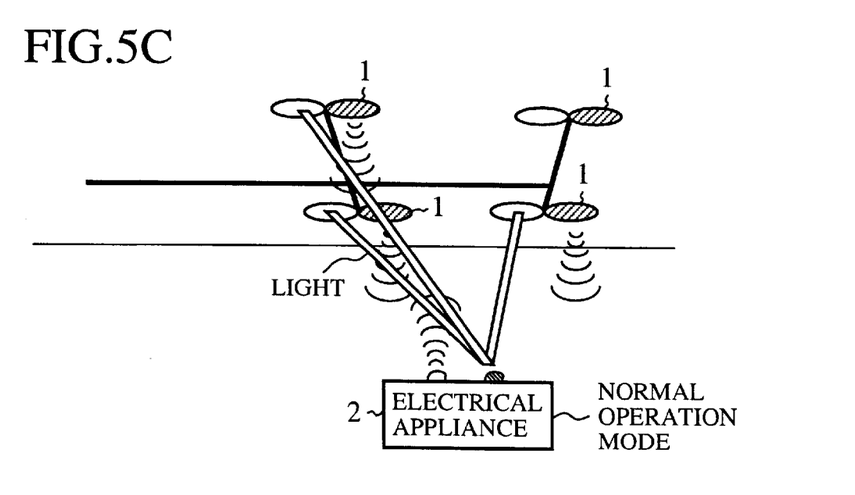

FIGS. 5A–5C are diagrams illustrating detection of the 3-D position of an electrical appliance in the present embodiment 2. First, as illustrated in FIG. 5A, the electrical appliance 2 receives the default power radio waves from the plurality of power transmission terminals 1, and is switched on as in the foregoing embodiment 1.

Subsequently, as illustrated in FIG. 5B, while the electrical appliance 2 transmits its own unique data or ID data by radio waves, the network host 3 has the plurality of power transmission terminals 1 to collect incoming radio wave intensity data, and calculates the 3-D position of the electrical appliance 2 from the radio wave intensity data measured from at least three points. Here, the radio wave intensity data are collected by the radio transceiver 24, radio communication section 23 and controller 21 in each of the power transmission terminals 1, and are transmitted from the radio communication section 23 to the network host 3.

After that, as illustrated in FIG. 5C, calculating the 3-D position of the electrical appliance 2 from the radio wave intensity data sent from the power transmission terminals 1, the network host 3 assigns respective parts of the power intensity required by the electrical appliance 2 to a few power transmission terminals 1 close to the calculated 3-D position, and commands them to emit light beams separately. In this case, the optical transceiver 14 of each power transmission terminal 1 turns the launching direction of the emitted light toward the electrical appliance 2. The reason for distributing the required power to the multiple power transmission terminals 1 is to prevent a single power transmission terminal 1 from emitting high intensity light, and to take countermeasures against communication interference. The light powers of the individual power transmission terminals 1 are calculated by the network host 3.

As described above, the present embodiment 2 is configured such that the network host 3 calculates the 3-D position of the electrical appliance 2. This offers an advantage of being able to launch the power in optimum directions toward the electrical appliance 2 so that the power transmission can be carried out following the movement of the electrical appliance 2.

Embodiment 3

The entire configuration of the cordless power transmission system, the configuration of each power transmission terminal 1 and that of each electrical appliance 2 of the present embodiment 3 are the same as their counterparts of the embodiment 1 as shown in FIGS. 1–3. The present embodiment 3 is characterized in that its power transmission terminals 1 are mounted on a ceiling of a room or the like.

Next, the operation of the present embodiment 3 will be described.

Figure 6A:
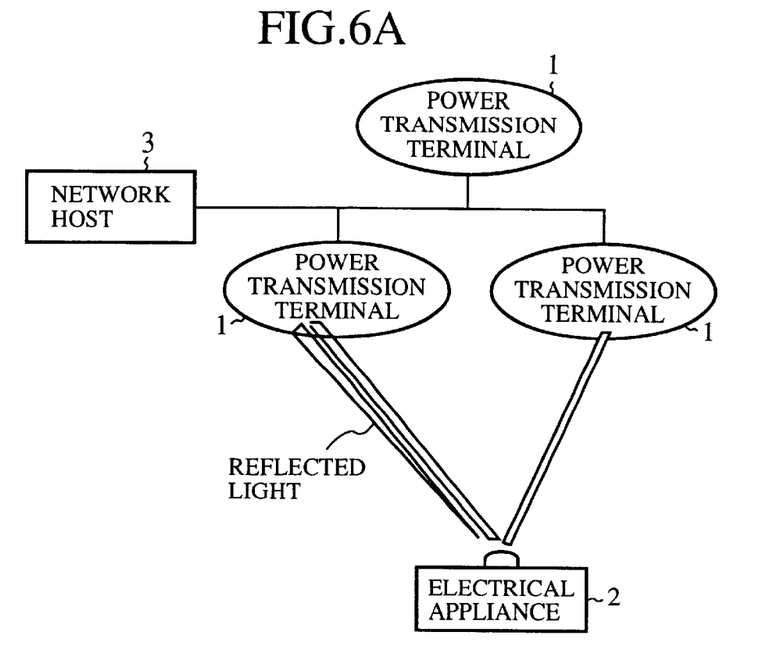
FIGS. 6A and 6B are block diagrams illustrating an operation when a radio communication is interrupted by an obstacle in an embodiment 3 in accordance with the present invention.
Figure 6B:
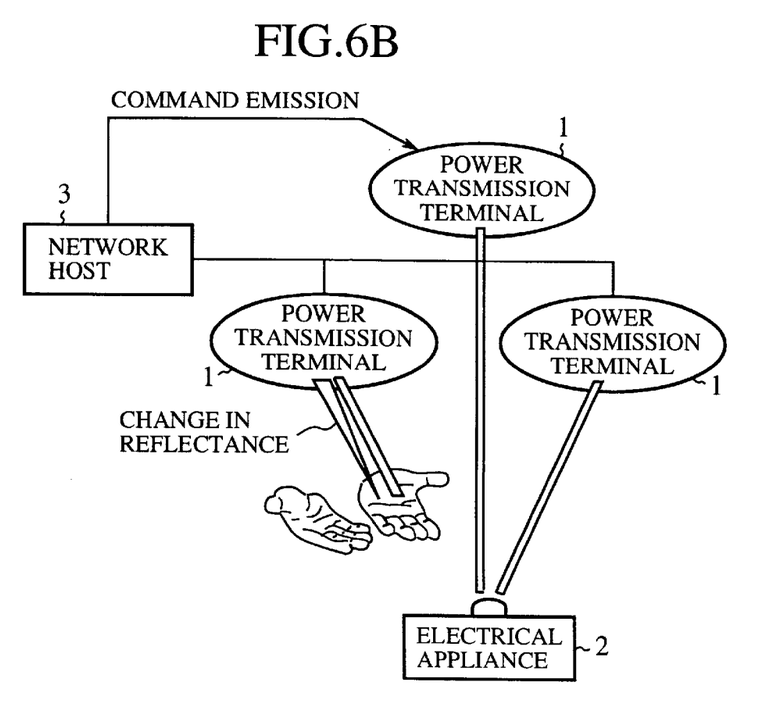
Figure 7:
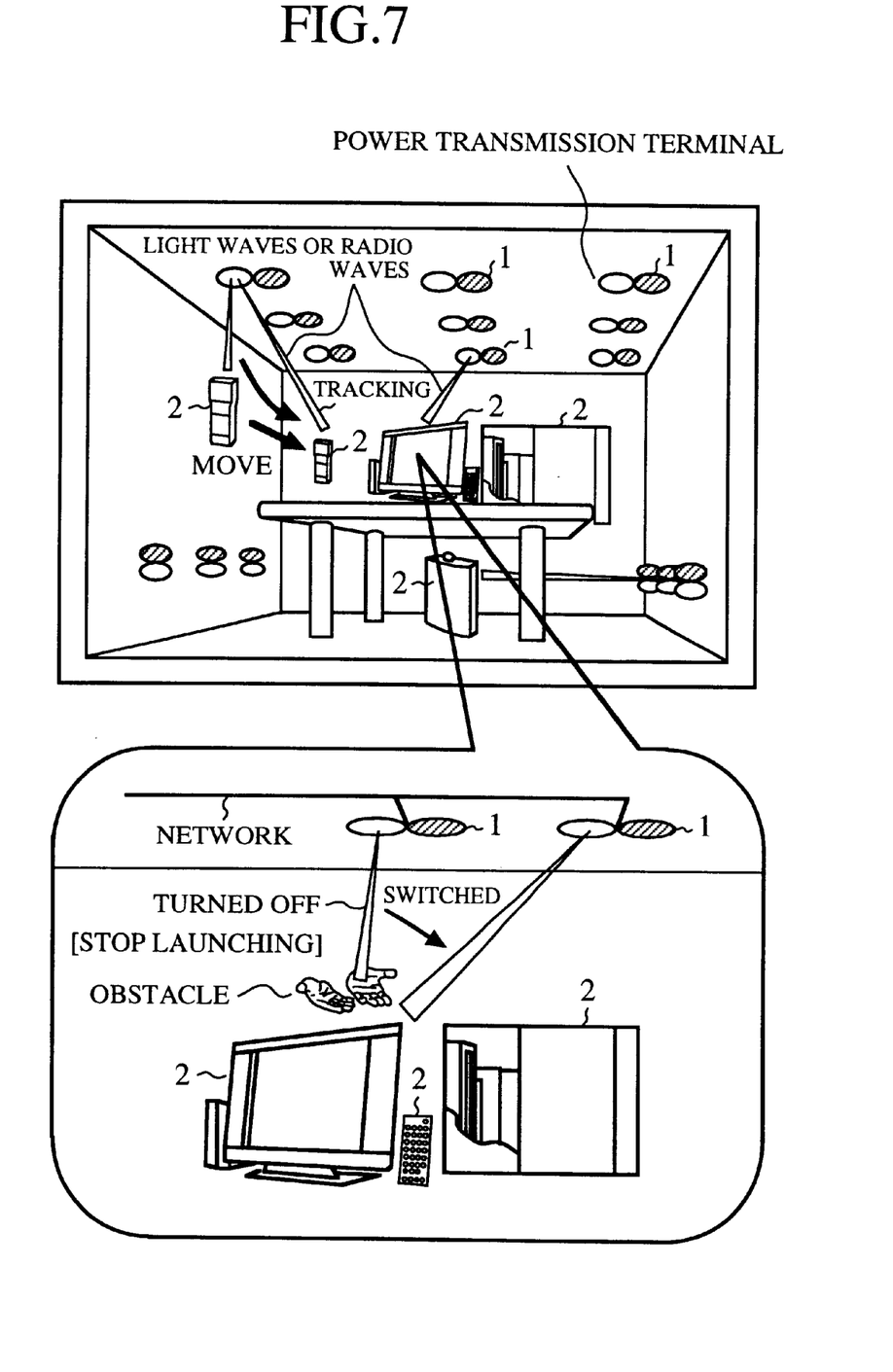
FIG. 7 is a view illustrating a case where a cordless power transmission system of the embodiment 3 in accordance with the present invention is applied to electric appliances in a room.

FIGS. 6A and 6B are block diagrams illustrating an operation when a radio communication is interrupted by an obstacle in the present embodiment 3, and FIG. 7 is a view illustrating a case where the cordless power transmission system of the embodiment 3 is applied to electric appliances in a room. As illustrated in FIG. 6A, launching a light beam, each power transmission terminal 1 detects its reflectance on the surface of an electrical appliance 2 or the like, and notifies the network host 3 of the reflectance. The reflectance is detected by the optical transceiver 14, optical communication section 13 and controller 11 in each power transmission terminal 1, and is transmitted from the optical communication section 13 to the network host 3.

When the reflectance changes sharply, the network host 3 considers the sudden change in the reflectance is brought about by the interference with the power light beam and radio waves caused by an obstacle as shown in FIGS. 6B and 7. Thus, the network host 3 instructs another power transmission terminal 1 which receives the ID data radio waves from the electrical appliance 2 to emit a power light beam.

Thus, the network host 3, monitoring and managing the system, carries out the light power transmission/optical communication with the electrical appliance 2 through the optimum routes from the power transmission terminals 1.

As described above, the present embodiment 3 is configured such that it continues the light power transmission/optical communication using the substitute power transmission terminal 1 when the current communication path is interrupted. Accordingly, it offers an advantage of being able to minimize the power variations and communication interruption.

Embodiment 4

Although the configurations of the power transmission terminal 1 and electrical appliance 2 in the present embodiment 4 are the same as those of the embodiment 1 as shown in FIGS. 2 and 3, the cordless power transmission system is installed in each room of a building in the present embodiment 4.

Figure 8:
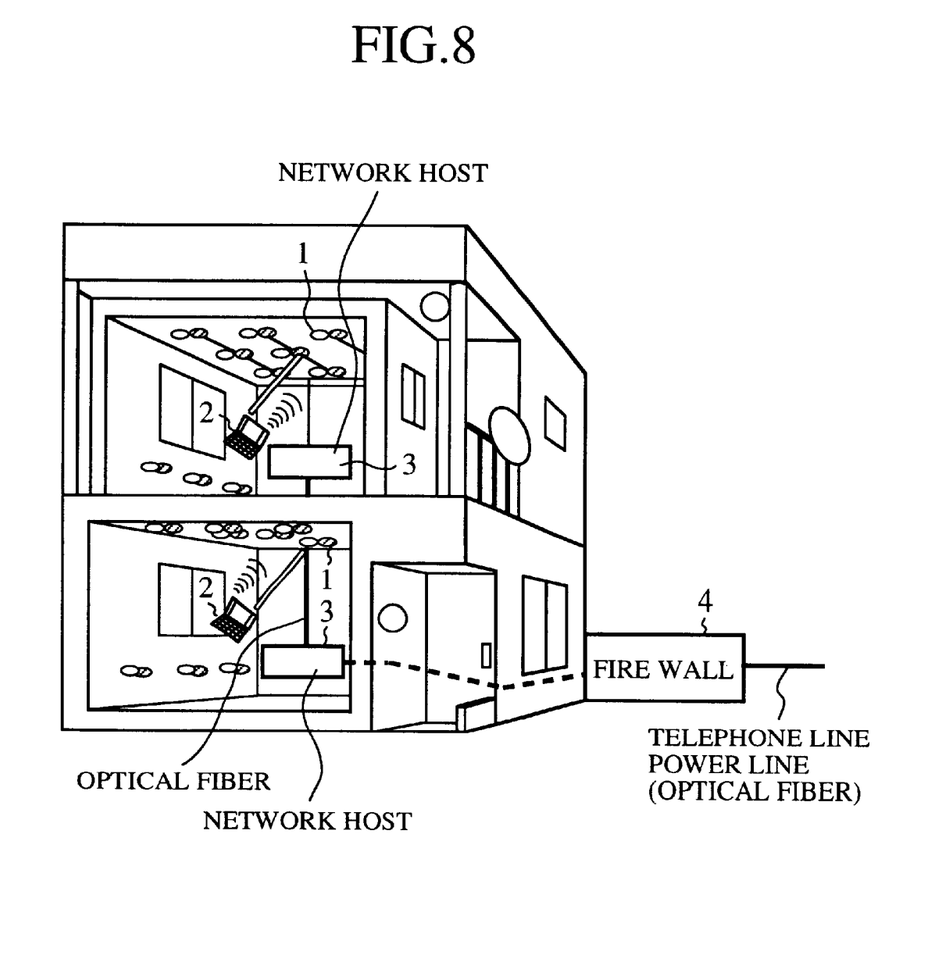
FIG. 8 is a perspective view showing an entire configuration of a cordless power transmission system of an embodiment 4 in accordance with the present invention.

FIG. 8 is a perspective view showing an entire configuration of a cordless power transmission system of the embodiment 4 in accordance with the present invention, in which the cordless power transmission system in each room is the same as that of the embodiment 1 as shown in FIG. 1. In FIG. 8, the network hosts 3 in the individual rooms are interconnected through optical fibers which are connected to external optical fibers constituting an external telephone line and a power line through a fire wall 4.

Next, the operation of the present embodiment 4 will be described.

Utilizing wireless media such as light waves for the power transmission and data communications and microwaves for the default power transmission and 3-D position detection, and carrying out fiber communications between the network hosts 3 in the individual rooms, the cordless power transmission system of the present embodiment 4 exchanges image data and the like. In addition, the network hosts 3 communicate with external equipment through the fiber wall 4 to undergo the external remote control.

As described above, since the present embodiment 4 combines the advantages of the wire and wireless media, it offers an advantage of being able to implement communications across the rooms or communications with the outside, such as image data transfer and remote control.

Furthermore, employing the cordless power transmission system as an infrastructure for the high-speed communications with the outside can implement high-speed radio data communications inside and outside the rooms. In addition, the infrastructure is applicable to other purposes. For example, a security system can be implemented by monitoring the movement and temperature of an obstacle by the network hosts 3 using the very weak radio waves emitted from the plurality of power transmission terminals 1.

What is claimed is:

1. A cordless power transmission system comprising:
   at least one power transmission terminal connected to a network;
   at least one electrical appliance supplied with power from said power transmission terminal by electromagnetic waves;
   a network host connected to the network for managing said electrical appliance via said power transmission terminal;

a default power transmitter installed in said power transmission terminal for transmitting default power to said electrical appliance by diffractive electromagnetic waves;

a first data transceiver installed in said electrical appliance for receiving default power, and for transmitting unique data and required power intensity data to said power transmission terminal by diffractive electromagnetic waves;

a second data transceiver installed in said power transmission terminal for receiving the unique data and required power intensity data from said electrical appliance, and for transmitting them to said network host; and a power transmitter installed in said power transmission terminal for transmitting ID data to be assigned to said electrical appliance and power with a required intensity to said electrical appliance by rectilinear electromagnetic waves, wherein said network host obtains the ID data to be assigned to said electrical appliance from the unique data of said electrical appliance, and obtains the required intensity of the power to be transmitted from said power transmission terminal from the required power intensity data sent from said electrical appliance.

2. The cordless power transmission system according to claim 1, wherein said first data transceiver continuously transmits the ID data, which is assigned to said electrical appliance by said network host, to said power transmission terminal by the diffractive electromagnetic waves while said electrical appliance is in a normal operation mode, and said second data transceiver notifies said network host of the ID data received by said power transmission terminal.

3. The cordless power transmission system according to claim 2, further comprising a plurality of power transmission terminals, each of which includes a data collector for collecting intensity data of the electromagnetic waves arriving at said power transmission terminal from said electrical appliance, wherein said network host obtains a 3-D position of said electrical appliance from the intensity data of the electromagnetic waves collected by said power transmission terminals, and assigns a part of the required intensity power to each of said power transmission terminals.

4. The cordless power transmission system according to claim 1, comprising at least two power transmission terminals, each of which includes a reflectance detector for detecting reflectance of the rectilinear electromagnetic waves while said power transmission terminals are transmitting required power by the rectilinear electromagnetic waves, and said second data transceiver of each of said power transmission terminals notifies said network host of the reflectance, wherein said network host has the power transmission terminals other than the power transmission terminal whose reflectance of the electromagnetic waves varies substantially, transmit the required power.

5. The cordless power transmission system according to claim 1, wherein said network host is installed in each room, and the network hosts are interconnected by a cable to exchange data between the rooms.

6. The cordless power transmission system according to claim 5, wherein said network hosts are connected to an external communication circuit via a fire wall.

7. The cordless power transmission system according to claim 1, wherein the diffractive electromagnetic waves consist of radio waves; and the rectilinear electromagnetic waves consist of light waves.

8. The cordless power transmission system according to claim 7, wherein said power transmitter of said power transmission terminal converts AC power into light power with the required intensity, transmits it to said electrical appliance by light waves, and carries out information communication with said electrical appliance by the light waves;

said default power transmitter converts the AC power into radio power, and transmits the default power to said electrical appliance by the radio waves; and said second data transceiver carries out information communication with said electrical appliance by the radio waves.

9. The cordless power transmission system according to claim 7, wherein said electrical appliance further comprises:

a light section for converting light power transmitted from said power transmission terminal into electric power, and for carrying out information communication with said power transmission terminal by light waves, and wherein said first data transceiver converts the radio power transmitted from said power transmission terminal into electric power, and carries out information communication with said power transmission terminal by the radio waves.

10. A power transmission terminal that supplies power to an electrical appliance by electromagnetic waves in accordance with a command sent from a network host connected to a network, said power transmission terminal comprising:

a default power transmitter for supplying said electrical appliance by diffractive electromagnetic waves;

a data transceiver for receiving unique data and required power intensity data associated with said electrical appliance from said electrical appliance by diffractive electromagnetic waves, and for transmitting these data to said network host; and a power transmitter for transmitting ID data and power with a required intensity to said electrical appliance by rectilinear electromagnetic waves, the ID data and the required intensity of the power being assigned to said electrical appliance and to said power transmission terminal, respectively, by said network host.

11. An electrical appliance that receives power by electromagnetic waves transmitted from a power transmission terminal connected to a network host through a network, said electrical appliance comprising:

a default power receiver for receiving default power from said power transmission terminal by diffractive electromagnetic waves;

a data transmitter for transmitting unique data and required power intensity data associated with said electrical appliance to said power transmission terminal by diffractive electromagnetic waves; and a power receiver for receiving ID data and power with a required intensity from said power transmission terminal by rectilinear electromagnetic waves, the ID data and the required intensity of the power being assigned to said electrical appliance and to said power transmission terminal, respectively, by said network host.

* * * * *